No. 652,413. Patented June 26, 1900.
W. H. WALLINGFORD & F. C. CROWE.
COFFEE POT.
(Application filed Mar. 5, 1900.)
(No Model.)
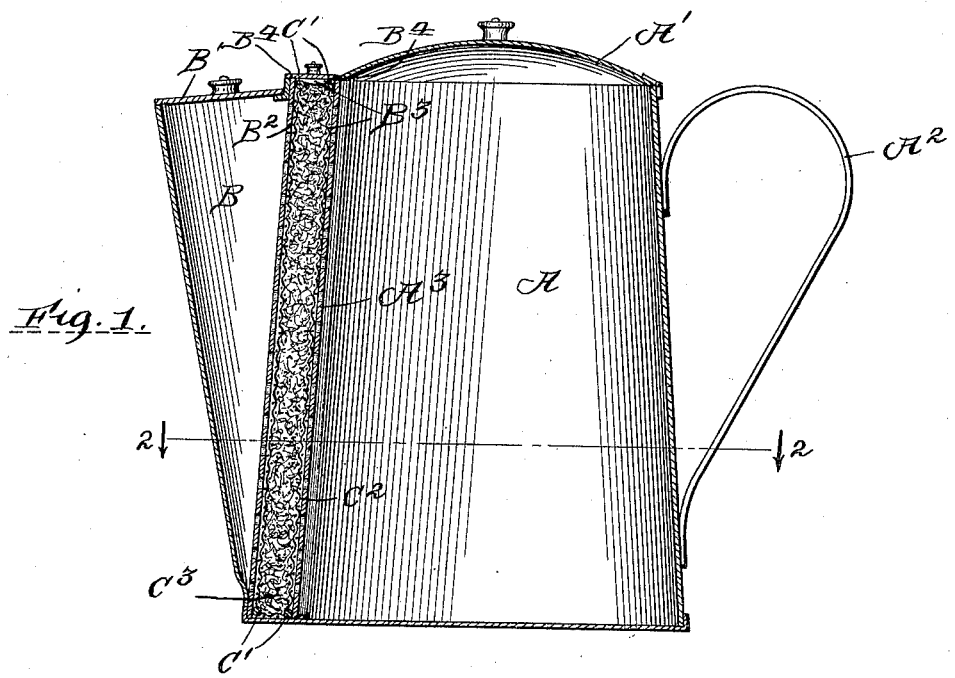
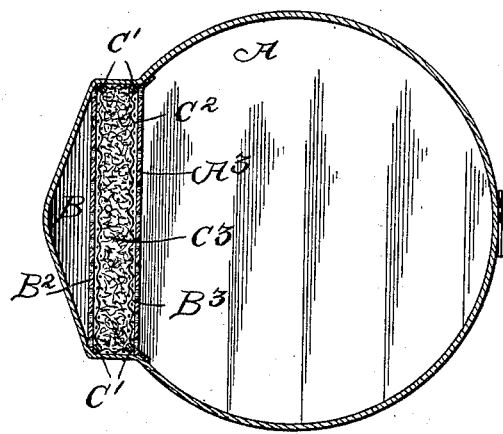
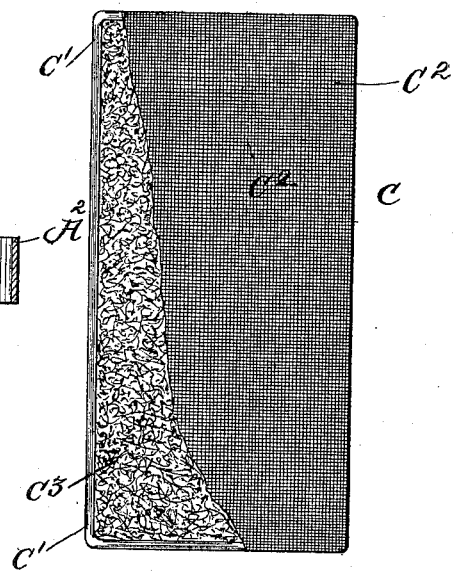
Witnesses:
R. White.
Harry R. E. White.
Inventors.
William H. Wallingford
Frederick C. Crowe.
By Luther R. Miller
Attorney.
THE NORRIS PETERS CO., PHOTO-LITHO., WASHINGTON, D. C.

UNITED STATES PATENT OFFICE.

WILLIAM H. WALLINGFORD AND FREDERICK C. CROWE, OF CHICAGO, ILLINOIS.

COFFEE-POT.

SPECIFICATION forming part of Letters Patent No. 652,413, dated June 26, 1900.

Application filed March 5, 1900. Serial No. 7,301. (No model.)

*To all whom it may concern:*

Be it known that we, WILLIAM H. WALLINGFORD and FREDERICK C. CROWE, citizens of the United States, and residents of Chicago, in the county of Cook and State of Illinois, have invented certain new and useful Improvements in Coffee-Pots, of which the following is a specification.

This invention relates to improvements in coffee-pots, and has for its object the production of a coffee-pot having a filter for clearing the liquid coffee of all solid matter as the beverage is poured from the pot.

In the embodiment herein shown of this invention a water-tight receptacle is provided having a suitable handle and a pouring-spout, the latter extending from a point near the bottom of said receptacle to the top thereof. The adjacent walls of the spout and the body portion are finely perforated and are placed a little distance apart, allowing a space between them for the reception of the filtering materials, which latter are inclosed in a casing of wire-gauze, and this casing may readily be removed from or inserted into said space.

In the accompanying drawings, Figure 1 is a vertical central section through a coffee-pot embodying the features of our invention. Fig. 2 is a horizontal section on dotted line 2 2 of Fig. 1. Fig. 3 is a face view, partly in section, of the wire-gauze casing for containing the filtering materials.

Like letters of reference indicate corresponding parts throughout the several views.

In the construction of this coffee-pot we provide the receptacle A, within which the ground coffee and the water for making the beverage are placed. The top of the receptacle A is closed by the hinged cover A', and one side of said receptacle is provided with the handle $A^2$. The side $A^3$ of the receptacle A located opposite to the handle $A^2$ is flattened and perforated.

B is the pouring-spout for the coffee-pot, its upper end being closed by the hinged cover B' and its rear wall $B^2$ perforated similarly to the wall $A^3$. The walls $B^2$ and $A^3$ stand parallel to each other and at a little distance apart, leaving a space $B^3$ between them for the reception of the filtering materials. These materials may be placed loosely in this space, but preferably are packed into a casing of gauze or other suitable material and said casing inserted into said space $B^3$. The upper end of the space $B^3$ is closed by the hinged cover $B^4$.

C is a casing, of wire-gauze or other suitable material, containing the filtering materials. This casing is composed of the wire framework C' and the sides and edges $C^2$ of wire-cloth. Any suitable filtering materials $C^3$ may be used in said casing. We have used sand, asbestos, charcoal, and tripoli mixed with good results.

In operation coffee is made within the receptacle A in the usual manner. The pouring-spout B is made large in order to have a considerable capacity and is extended downward to a point near the fire, so that the coffee in the spout may be kept warm. Liquid in the pouring-spout B rises to the same height as that within the receptacle A. When it is desired to pour a cup of coffee, that within the spout is poured out first, the flow through the filter being sufficiently rapid to insure a sufficient discharge through the spout B. The casing C is removable for cleaning or a renewal of the filtering materials. It may be taken from the space $B^3$ by raising the cover $B^4$ for said space and lifting said casing bodily therefrom. The casing fits the walls of the space $B^3$ with sufficient closeness to prevent coffee-grounds from passing around the filter.

We claim as our invention—

In a coffee-pot, in combination, a body portion comprising a main receptacle and a pouring-spout, the latter being throughout its length in communication with the interior of the main receptacle; two perforated walls extending between said spout and said receptacle, which walls are placed a little distance apart to provide a space for the insertion of a filter, and extend substantially from top to bottom of the body portion; a removable filter-casing for said space; and suitable filtering material for said casing.

WILLIAM H. WALLINGFORD.
FREDERICK C. CROWE.

Witnesses:
L. L. MILLER,
GEO. L. CHINDAHL.